US012779717B2

(12) United States Patent
Park et al.

(10) Patent No.: US 12,779,717 B2
(45) Date of Patent: Nov. 3, 2026

(54) RAZOR CARTRIDGE

(71) Applicant: DORCO CO., LTD., Seoul (KR)

(72) Inventors: Sung Jin Park, Seoul (KR); Hyo Sun Ahn, Seoul (KR)

(73) Assignee: Dorco Co., Ltd., Seoul (KR)

( * ) Notice: Subject to any disclaimer, the term of this patent is extended or adjusted under 35 U.S.C. 154(b) by 316 days.

(21) Appl. No.: 18/321,634

(22) Filed: May 22, 2023

(65) Prior Publication Data

US 2023/0373116 A1 Nov. 23, 2023

(30) Foreign Application Priority Data

May 23, 2022 (KR) ........................ 10-2022-0063097

(51) Int. Cl.
*B26B 21/40* (2006.01)
*B26B 21/22* (2006.01)

(52) U.S. Cl.
CPC .......... *B26B 21/4018* (2013.01); *B26B 21/22* (2013.01); *B26B 21/227* (2013.01); *B26B 21/40* (2013.01); *B26B 21/4012* (2013.01); *B26B 21/4025* (2013.01); *B26B 21/4031* (2013.01); *B26B 21/222* (2013.01)

(58) Field of Classification Search
CPC ............ B26B 21/4018; B26B 21/4031; B26B 21/4012; B26B 21/4025; B26B 21/4037; B26B 21/54; B26B 21/08; B26B 21/10; B26B 21/14; B26B 21/16; B26B 21/165; B26B 21/22; B26B 21/222; B26B 21/225; B26B 21/227; B26B 21/40
USPC ............................... 30/32, 55, 59, 77, 47–51
See application file for complete search history.

(56) References Cited

U.S. PATENT DOCUMENTS 4,270,268 A * 6/1981 Jacobson .............. B26B 21/227 30/47
4,621,424 A * 11/1986 Jacobson ............ B26B 21/4012 30/41
6,161,288 A * 12/2000 Andrews ................. B26B 29/00 30/527

(Continued)

FOREIGN PATENT DOCUMENTS

JP 2013099467 * 5/2013 ............. B26B 21/22
JP 2014-524790 A 9/2014

(Continued)

OTHER PUBLICATIONS

Machine translation—Sawai (JP 2013099467).*

(Continued)

*Primary Examiner* — Boyer D Ashley
*Assistant Examiner* — Haleigh N Watson
(74) *Attorney, Agent, or Firm* — Knobbe, Martens, Olson & Bear, LLP

(57) ABSTRACT

Disclosed is a razor cartridge according to an embodiment of the disclosure, which includes a blade formed with a cutting edge; a blade housing longitudinally accommodating the blade, and including a top to which the cutting edge is at least partially exposed and a bottom opposite to the top; and a guard member including a skin contact portion at least partially exposed to the top, and longitudinally accommodated in the blade housing so that the skin contact portion can move up and down relative to the blade housing.

9 Claims, 18 Drawing Sheets

(56) References Cited

U.S. PATENT DOCUMENTS

| | | | | |
|---|---|---|---|---|
| 6,671,961 | B1 * | 1/2004 | Santhagens | B26B 21/227 30/34.2 |
| 2011/0146079 | A1 * | 6/2011 | Clarke | B26B 21/4012 30/34.05 |
| 2018/0071929 | A1 | 3/2018 | Walker, Jr. et al. | |
| 2018/0071930 | A1 * | 3/2018 | Walker, Jr. | B26B 21/4031 |
| 2021/0031389 | A1 * | 2/2021 | Bozikis | A45D 27/225 |
| 2021/0379781 | A1 * | 12/2021 | Walker, Jr. | B26B 21/4012 |

FOREIGN PATENT DOCUMENTS

| | | | | |
|---|---|---|---|---|
| KR | 10-2022-0027512 | A | 3/2022 | |
| WO | WO-9525617 | A1 * | 9/1995 | B26B 21/22 |
| WO | WO-2014119808 | A1 * | 8/2014 | B26B 21/4012 |

OTHER PUBLICATIONS

Machine translation—Park (WO 2014119808).*

Office Action received in Korean Application No. 10-2022-0063097 dated Dec. 2, 2024.

* cited by examiner

RAZOR CARTRIDGE

CROSS REFERENCE TO RELATED APPLICATION

This application claims the benefit of Korean Patent Application No. 10-2022-0063097, filed on May 23, 2022, the contents of which are all hereby incorporated by reference herein in their entirety.

BACKGROUND OF THE INVENTION

Field of the Invention

The disclosure relates to a razor cartridge, and more particularly to a razor cartridge in which a razor blade is accommodated.

Description of the Related Art

In general, a razor refers to a device that is used to cut body hair such as fine hair and beard from a face or body, and includes a handle for gripping, and a razor cartridge with a razor blade for shaving while being in contact with skin.

The razor is classified into a system razor having a replaceable razor cartridge, and a disposable razer having a nonreplaceable razor cartridge.

Among the razor cartridges including a plurality of blades, there is a razor cartridge that includes a non-cutting member having no cutting function in order to reduce a shaving irritation caused by the razor blades.

However, a conventional non-cutting member is fixedly provided in the razor cartridge. Therefore, it is difficult to provide a sufficiently three-dimensional sense of shaving.

SUMMARY OF THE INVENTION

An aspect of the disclosure is to provide a razor cartridge improved in shaving efficiency.

Another aspect of the disclosure is to provide a razor cartridge a three-dimensional sense of shaving.

The problems of the disclosure are not limited to the aforementioned problems, and other problems not mentioned above may become apparent to those skilled in the art from the following description.

According to an embodiment of the disclosure, a razor cartridge includes a blade formed with a cutting edge; a blade housing longitudinally accommodating the blade, and including a top to which the cutting edge is at least partially exposed and a bottom opposite to the top; and a guard member including a skin contact portion at least partially exposed to the top, and longitudinally accommodated in the blade housing so that the skin contact portion can move up and down relative to the blade housing.

Other details of the disclosure are included in the detailed description and the accompanying drawings.

According to the embodiments of the disclosure, the effects are at least as follows.

The guard member is provided between the plurality of blades, thereby reducing a skin irritation that occurs during the shaving process.

Further, the skin contact portion between the plurality of blades moves up and down along the contour of a shaving area, thereby achieving a more effective and three-dimensional shave.

Further, the plurality of blades moves up and down along the contour of a shaving area, thereby achieving a more effective and three-dimensional shave.

The effects of the disclosure are not limited to those described above, and various other effects are included in the foregoing description.

DETAILED DESCRIPTION OF THE INVENTION

Figure 1:
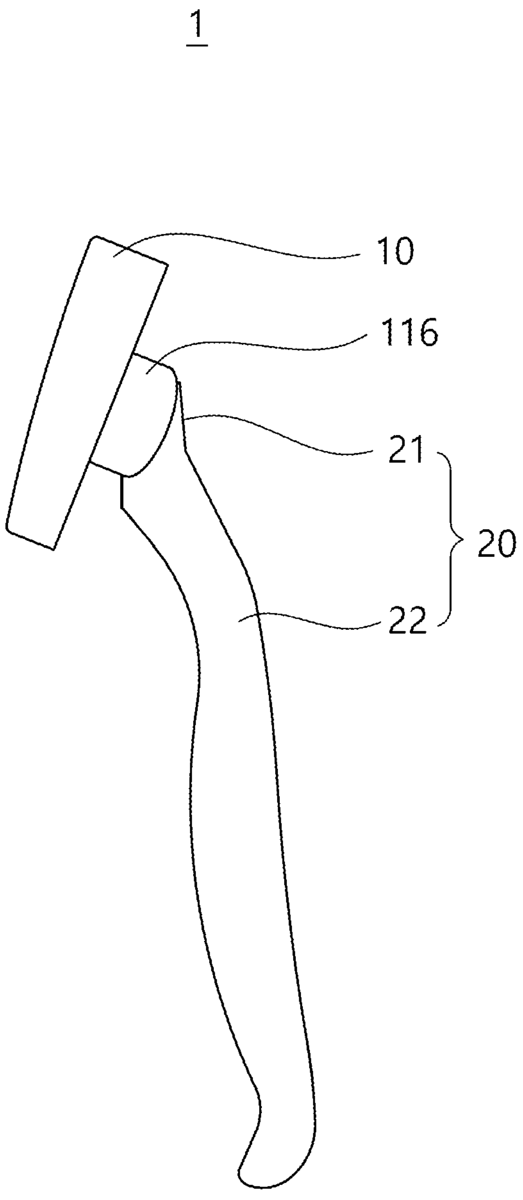
FIG. 1 is a perspective view of a razor according to an embodiment of the disclosure.

The merits and characteristics of the disclosure and a method for achieving the merits and characteristics will become more apparent from embodiments described below in detail in conjunction with the accompanying drawings. However, the disclosure is not limited to the disclosed embodiments, but may be implemented in various different ways. The embodiments are provided to only complete the disclosure and to allow those skilled in the art to understand the category of the disclosure. The disclosure is defined by the category of the claims.

In addition, embodiments of the disclosure will be described with reference to cross-sectional views and/or schematic views as idealized exemplary illustrations. Therefore, the illustrations may be varied in shape depending on manufacturing techniques, tolerance, and/or etc. Further, elements in the drawings may be relatively enlarged or reduced for convenience of description. Like numerals refer to like elements throughout.

Further, first, second, i), ii), a), b) and the like terms may be used in describing elements according to embodiments of the disclosure. Such terms are used solely for the purpose of differentiating one element from another, but not limit the substances, the order, sequence, etc. of those elements. Throughout this specification, when a part 'includes' or 'comprises' an element, the part is meant to further include other elements rather than excluding other elements unless otherwise stated explicitly.

Below, a razor according to embodiment of the disclosure will be described with reference to the accompanying drawings.

FIG. 1 is a perspective view of a razor according to an embodiment of the disclosure.

Referring to FIG. 1, a razor 1 according to an embodiment includes a razor cartridge 10, and a handle 20 to which the razor cartridge 10 is rotatably coupled.

The handle 20 includes a handle header 21 and a handle body 22.

The handle body 22 refers to a part to be gripped by a user of the razor 1. The handle header 21 is provided at a first end of the handle body 22, allows the razor cartridge 10 to be detachably coupled thereto, and rotatably supports the coupled razor cartridge 10.

The handle header 21 rotatably couples with a connector 116 formed in a lower portion of the razor cartridge 10, and supports the razor cartridge 10 to be rotatable within a predetermined angle range with respect to an immovable shaft or a shaft movable within a predetermined range.

Further, the handle header 21 may detachably couple with a handle coupling portion 11. In this case, the handle 20 may be provided with a manipulation portion (not shown) for manipulating the handle header 21, and the handle header 21 is configured to be released from the coupling with the connector 116 as a user manipulates the manipulation portion.

Figure 2:
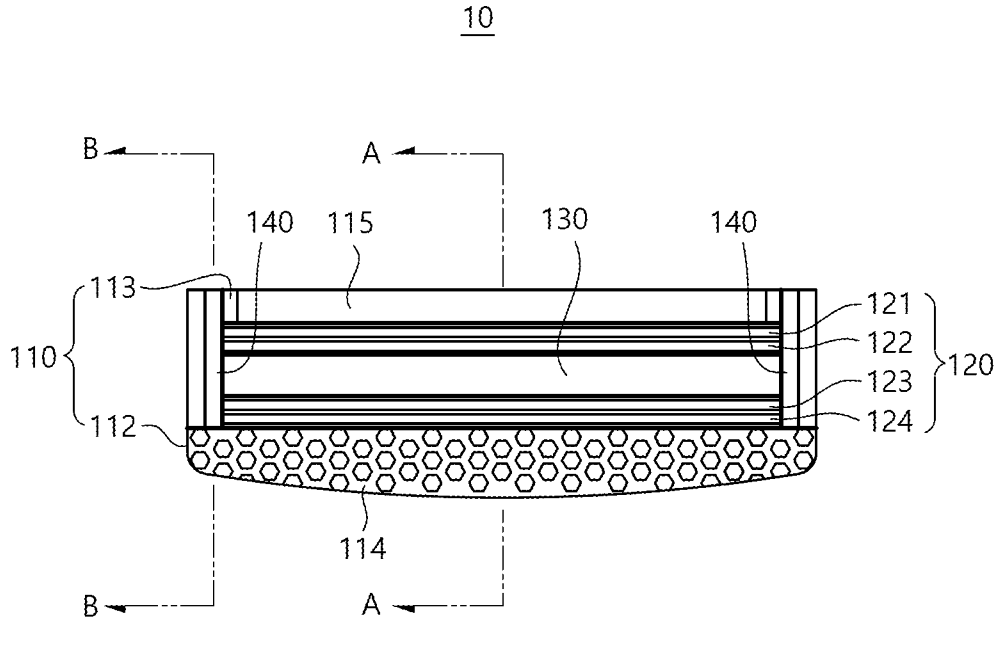
FIG. 2 is a front view of a razor cartridge according to an embodiment of the disclosure.
Figure 3:
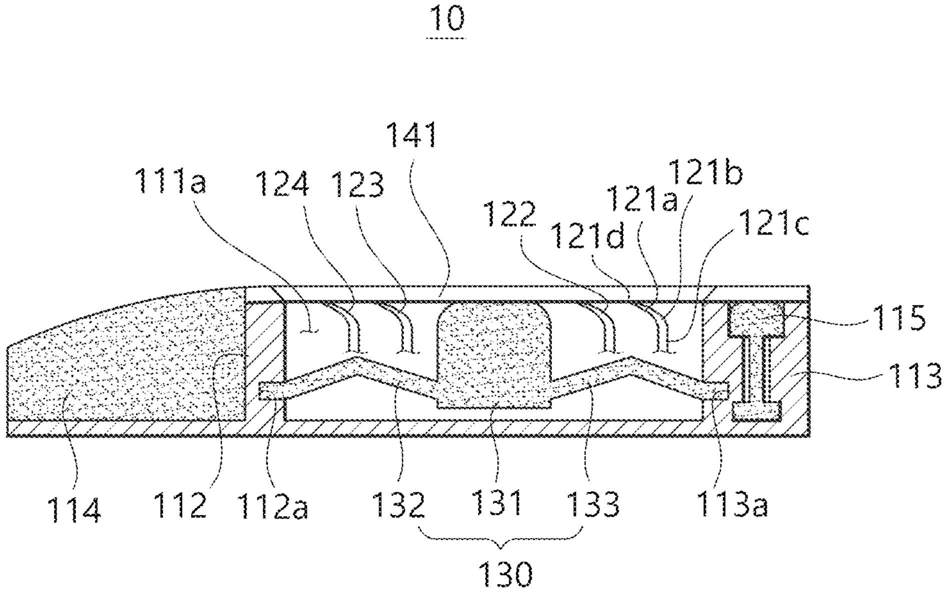
FIG. 3 is a schematic cross-sectional view taken along line AA of FIG. 2.

FIG. 2 is a front view of the razor cartridge 10 according to an embodiment of the disclosure, and FIG. 3 is a schematic cross-sectional view taken along line AA of FIG. 2.

Referring to FIGS. 2 and 3, the razor cartridge 10 may include a plurality of blades 120, a guard member 130, a clip 140, and a blade housing 110.

The blade housing 110 may include a guard 112 and a cap 113.

The guard 112 may be formed in the front of the blade housing 110, and the cap 113 may be formed in the back of the blade housing 110.

The guard 112 may include a guard rubber 114 exposed to the top of the blade housing 110. The guard rubber 114 comes into contact with a user's skin and pulls the skin during a shaving process, thereby improving the shaving effect of the blade 120. To more effectively pull the user's skin, the guard rubber 114 may have an embossed or engraved pattern on an upper surface thereof, and the guard rubber 114 may be made of rubber, silicone, or the like material. However, the disclosure is not limited to this embodiment, and the guard 112 may be made of a plastic material without the guard rubber 114.

The cap 113 may include a lubrication band 115 exposed through the top of the blade housing 110. The lubrication band 115 includes a lubricating material, and applies the lubricating material onto a skin surface during the shaving process. The lubricating material may contain components for protecting the skin during the shaving.

The blade housing 110 includes a blade window 111*a* opened upwards between the guard 112 and the cap 113.

The guard member 130 is longitudinally accommodated in the blade housing 110 so that the top of a skin contact portion 131 can be exposed to the top of the blade housing 110 through the blade window 111*a*.

As shown in FIGS. 2 and 3, the guard member 130 may be provided between the plurality of blades 120. In this case, the skin contact portion 131 maintains contact with the skin while moving up and down between the plurality of blades 120 along the curvature of a face, thereby improving a sense of close-contact with skin, achieving a clean shave, and providing a three-dimensional sense of shaving during the shaving process.

FIG. 2 and FIG. 3 illustrate an example that two blades 123 and 124 are placed in front of the skin contact portion 131 and two blades 121 and 122 are placed in back of the skin contact portion 131. However, according to an alternative embodiment, more blades may be placed in front of the skin contact portion 131 than in back, or more blades may be placed in back of the skin contact portion 131 than in front.

The guard member 130 will be described later in more detail with reference to FIG. 4.

The blade housing 110 may accommodate each blade 120 longitudinally (or lengthwise or laterally), and the blades 120 may be arranged side by side (backwards and forwards) with respect to other blades 120.

Referring to FIG. 3, each of the blades 121, 122, 123, and 124 may include an edge portion 121*a*, a bending portion 121*b*, and a base portion 121*c*. The edge portion 121*a* may be inclined forwards with respect to the base portion 121*c*, and the bending portion 121*b* may connect the edge portion 121*a* and the base portion 121*c*. At the end of the edge portion 121*a*, a cutting edge 121*d* is formed. The cutting edge 121*d* is extended along the longitudinal direction (or the lengthwise direction) of the blade 120. In FIG. 3, an integrated bending blade where the edge portion 121*a*, the bending portion 121*b* and the base portion 121*c* are formed as a single body is illustrated as an example of the blades 121, 122, 123, and 124, but a welded blade where the edge portion is welded to the bending portion may be implemented as the blade according to embodiments.

The plurality of blades 120 are accommodated in the blade housing 110 so that the cutting edge 121*d* can be at least partially exposed to the top of the blade housing 110 through the blade window 111*a*.

The blade housing 110 may include a seating portion 111*b* formed with a seating groove 111*d* on which the base portion 121*c* is seated. In this regard, details will be described later with reference to FIG. 5.

FIGS. 2 and 3 illustrate an example that the razor cartridge 10 includes four blades 121, 122, 123, and 124, but the number of blades 120 may be changed according to embodiments.

The blade housing 110 may include the connector 116 extended backwards. The connector 116 may be configured as a fixed type formed integrally with the blade housing 110, or a rotary or shell-bearing type rotatable with respect to the blade housing 110.

Figure 4:
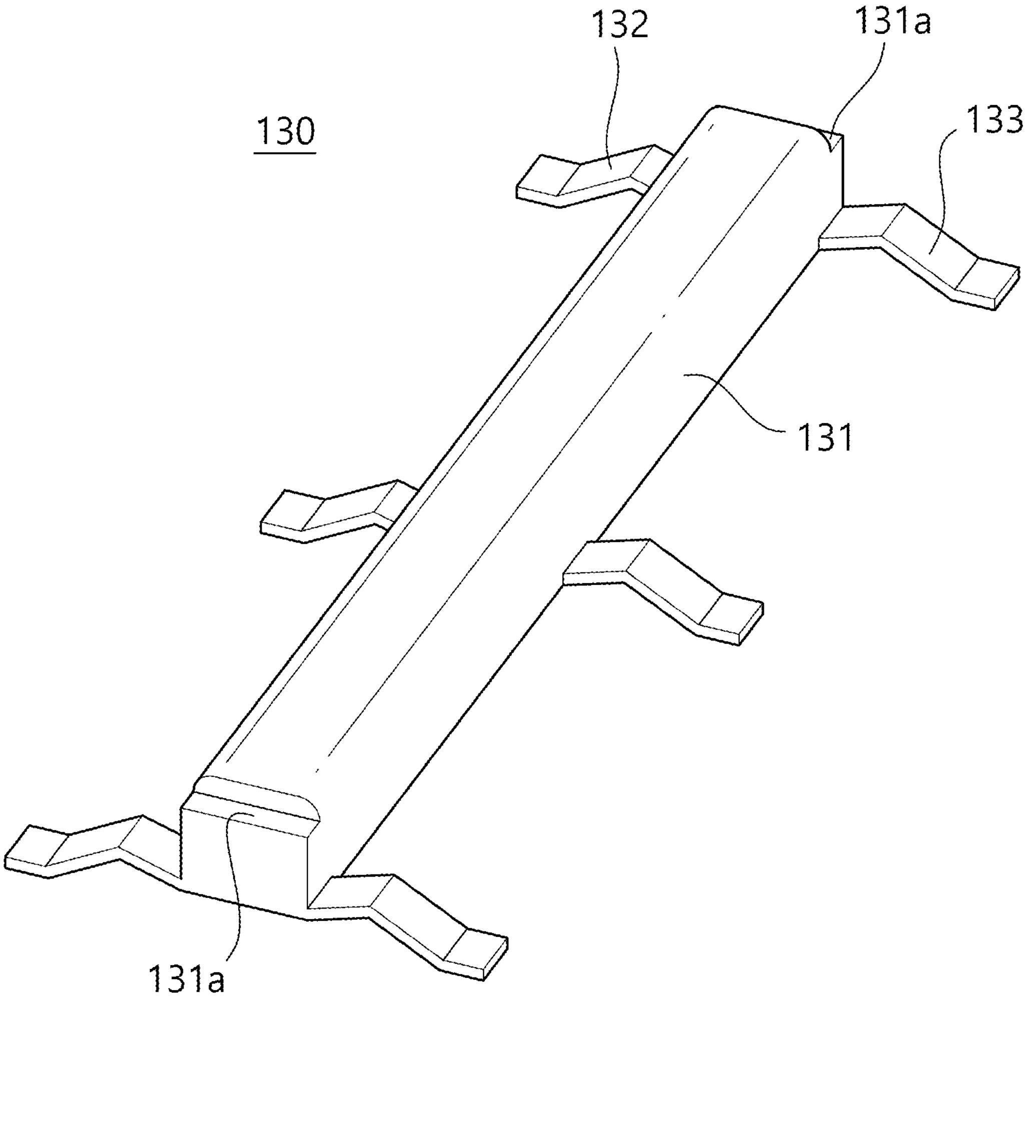
FIG. 4 is a schematic perspective view of a guard member according to a first embodiment.

FIG. 4 is a schematic perspective view of the guard member 130 according to a first embodiment.

Referring to FIG. 4, the guard member 130 includes the skin contact portion 131 and suspension portions 132 and 133.

The skin contact portion 131 may be longitudinally extended having approximately the same length as the cutting edge 121*d* of the blade 120.

The suspension portions 132 and 133 are transversely extended from the skin contact portion 131. The suspension portions 132 and 133 may be varied in number depending on suspension function degrees, and made of rubber, plastic and the like elastic material, thereby providing a suspension function to the guard member 130. To provide the elastic force and restoring force against force acting on the skin contact portion 131, as shown in FIGS. 3 and 4, the suspension portions 132 and 133 may be extended and bent more than once from the skin contact portion 131, but not limited thereto.

Referring to FIG. 3, a first suspension portion 132, which is extended forwards from the skin contact portion 131, between the suspension portions 132 and 133 may have an end portion inserted and supported by the guard 112. A second suspension portion 133, which is extended backwards from the skin contact portion 131, between the suspension portions 132 and 133 may have an end portion inserted and supported by the cap 113. The guard 112 and the cap 113 may be formed with recessed portions 112*a* and 113*a* in which the end portion of the first suspension portion 132 and the end portion of the second suspension portion 133 are inserted, respectively.

The suspension portions 132 and 133 provide the elastic force against force that acts on the skin contact portion 131 downwards, and provide the restoring force that restores the skin contact portion 131 upwards. Therefore, during the shaving process, the skin contact portion 131 maintains close contact with skin while moving up and down with respect to the blade housing 110 along the curvature of a face based on the elastic force and the restoring force of the suspension portions 132 and 133.

The blades 120 may be supported by the seating portion 111*b* (see FIG. 5), but at least some of the blades 120 may be supported by the suspension portions 132 and 133 according to embodiments. In this case, the suspension portions 132 and 133 may be formed to have a structure similar to the seating portion 111*b*, and the blades 120 may move up and down along with the suspension portions 132 and 133. In this case, during the shaving process, the blades 120 maintain contact with skin while moving up and down along the curvature of a face, thereby achieving a more effective and less irritative shave.

The structure or shape of the suspension portions 132 and 133 shown in FIGS. 3 and 4 is merely an embodiment for providing the elastic force and the restoring force to the skin contact portion 131, and may be changed into various structures or shapes as long as the suspension portions 132 and 133 can provide the elastic force and the restoring force to the skin contact portion 131.

Further, although it is not shown, according to an alternative embodiment, at least some of the suspension portions 132 and 133 may provide the elastic force and the restoring force to the skin contact portion 131 as the end portions thereof are supported by a portion other than the guard 112 or the cap 113 in the blade housing 110.

Further, according to an alternative embodiment, at least some of the suspension portions 132 and 133 may be longitudinally extended from the skin contact portion 131. In this case, the suspension portions extended in a lengthwise direction may provide the elastic force and the restoring force to the skin contact portion 131 as the end portions thereof are supported by the blade housing 110.

Referring to FIG. 4, clip supporting grooves 131*a* may be formed at upper opposite ends of the skin contact portion 131. The clip supporting groove 131*a* may form a stepped portion downwards from the top of the skin contact portion 131. The clip supporting groove 131*a* partially accommodates a supporter 141 of the clip 140. The supporter 141 accommodated in the clip supporting grooves 131*a* prevents the guard member 130 from being separated upwards from the blade housing 110. Because the top of the skin contact portion 131 protrudes upwards while forming the stepped portions from the clip supporting grooves 131*a*, the top of the skin contact portion 131 may be positioned above the cutting edges 121*d* of the blades 120. Meanwhile, the skin contact portion 131 may not include the clip supporting grooves 131*a*, and in this case the top of the skin contact portion 131 may be positioned on substantially the same plane as the cutting edges 121*d*.

Figure 5:
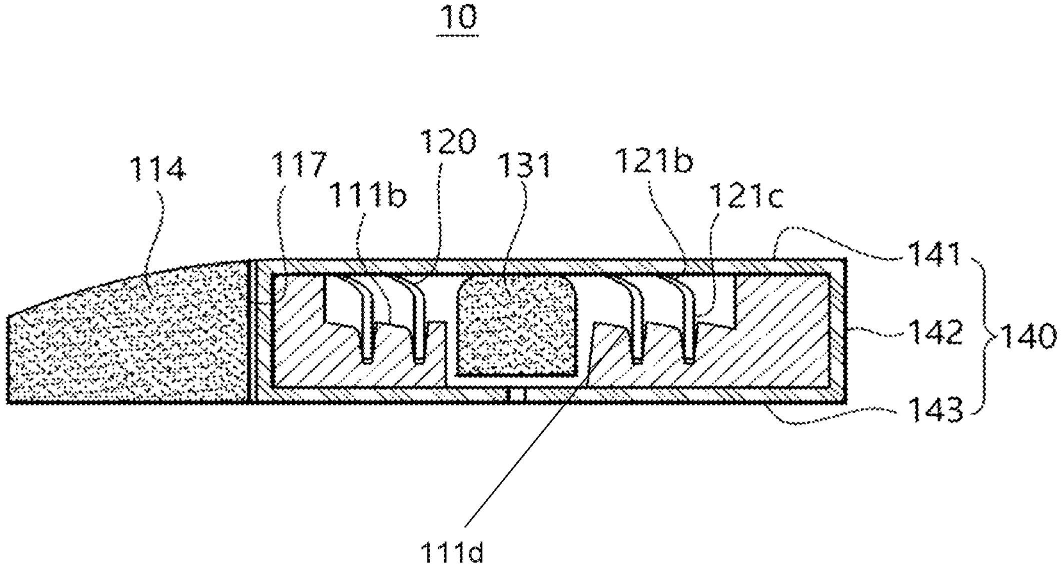
FIG. 5 is a schematic cross-sectional view taken along line BB of FIG. 2.

FIG. 5 is a schematic cross-sectional view taken along line BB of FIG. 2.

Referring to FIG. 5, the clip 140 is coupled to the blade housing 110 while covering the opposite sides of the blade window 111*a*. The clip 140 prevents the blade 120 and the guard member 130 from being separated from the blade housing 110.

The clip 140 includes the supporter 141, a first extension 142, and a second extension 143.

The supporter 141 is positioned on the top of the blade housing 110, and covers each side of the cutting edge 121*d* of the blade 120 and the opposite sides of the skin contact portion 131 of the guard member 130. The supporter 141 prevents the blade 120 and the guard member 130 from being separated through the top of the blade housing 110. The first extension 142 is extended from both ends (the front and rear ends) of the supporter 141 toward the bottom of the blade housing 110. The first extension 142 may pass through a through hole 117 formed in the blade housing 110, or surround one side of the blade housing 110. The second extension 143 is transversely extended from the end of the first extension 142 along the bottom of the blade housing 110.

The second extension 143 may be positioned below the skin contact portion 131 and support the bottom of the skin contact portion 131 so that the guard member 130 can be prevented from being separated through the blade housing 110.

Referring to FIG. 5, the base portion 121*c* of each blade 120 may be inserted in the seating groove 111*d* formed in the seating portion 111*b*. Each blade 120 is accommodated in the blade housing 110 while making the cutting edge 121*d* face the front of the blade housing 110. Each blade 120 is prevented from being separated downwards from the blade housing 110 as the base portion 121*c* is supported by the seating portion 111*b*, and prevented from being separated upwards from the blade housing 110 as the cutting edge 121*d* is supported by the clip 140.

Figure 6:
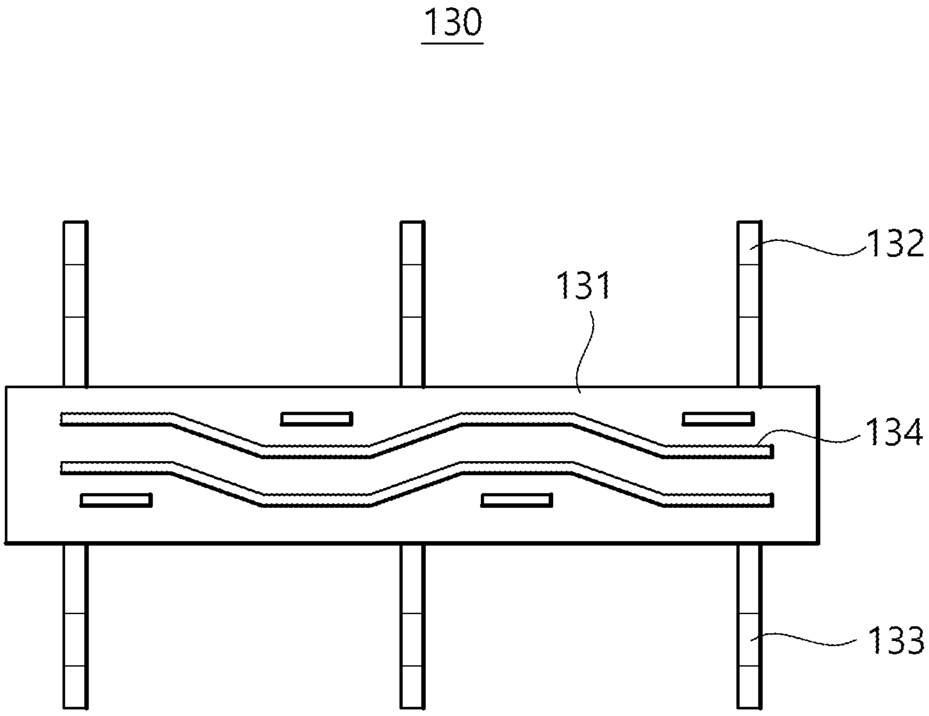
FIG. 6 is a schematic plan view of a guard member, which shows an example that a guard pattern is formed in a skin contact portion.

FIG. 6 is a schematic plan view of a guard member, which shows an example that a guard pattern 134 is formed in the skin contact portion 131.

The skin contact portion 131 pulls skin during the shaving process, thereby improving the shaving effect of the blades

121 and 122 following the skin contact portion 131. To this end, Referring to FIG. 6, the guard pattern 134 may be embossed or engraved on the top of the skin contact portion 131. Further, the top of the skin contact portion 131 may be made of rubber, silicone, or the like elastic material, but not limited thereto. However, the top of the skin contact portion 131 may be made of a plastic material.

The skin contact portion 131 may include a lubricating material on the top thereof, so that the lubricating material can be applied to the surface of skin during the shaving process.

Figure 7:
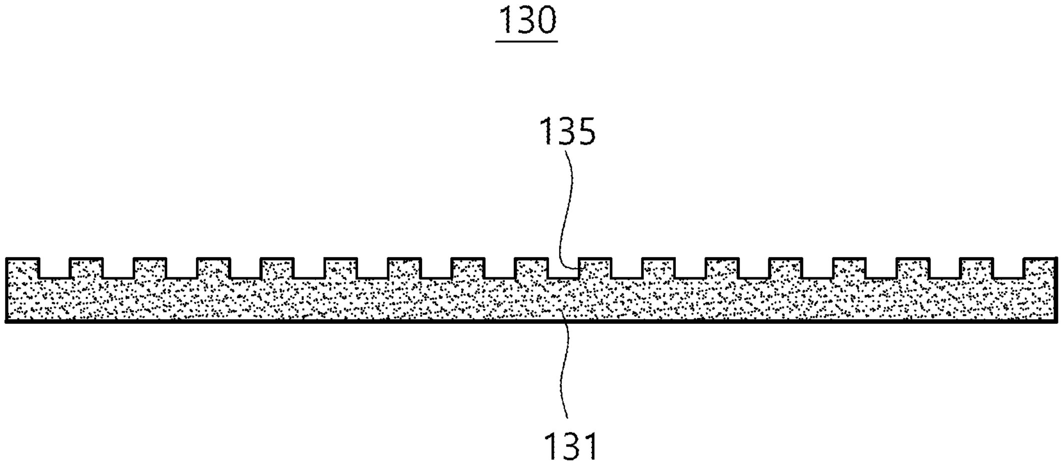
FIG. 7 is a schematic longitudinal cross-sectional view of a guard member, which shows an example that a comb is formed on the top of a skin contact portion.

FIG. 7 is a schematic longitudinal cross-sectional view of the guard member 130, which shows an example that a comb is formed on the top of the skin contact portion 131.

Referring to FIG. 7, a plurality of combs 135 is formed on the top of the skin contact portion 131, extended in a transverse direction, and arranged side by side in a longitudinal direction, thereby combing hair during the shaving process.

Figure 8:
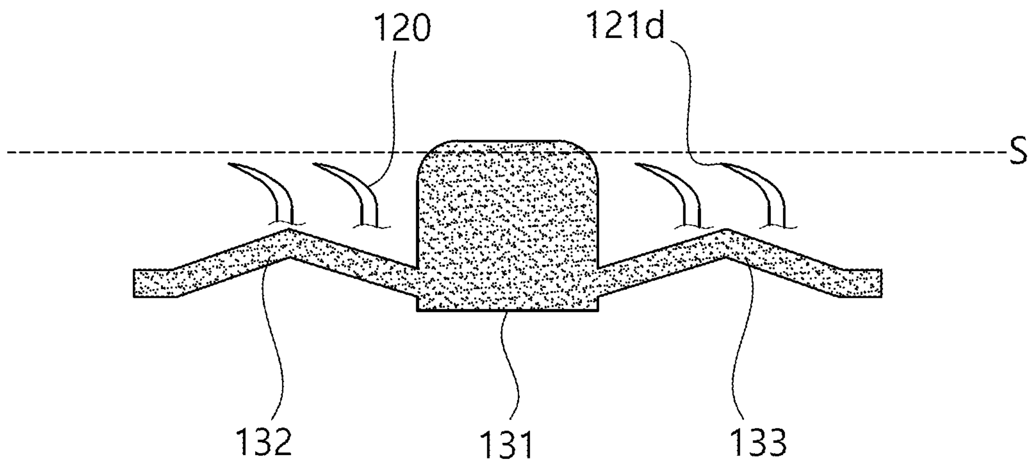
FIG. 8 schematically illustrates relative positions between a skin contact portion and blades while no external force acts on the skin contact portion.

FIG. 8 schematically illustrates relative positions between the skin contact portion 131 and the blades 120 while no external force acts on the skin contact portion 131.

Referring to FIG. 8, the top of the skin contact portion 131 may be positioned above a shaving plane S while no external force acts on the skin contact portion 131.

The shaving plane S refers to a plane where the razor cartridge 10 comes into contact with a user's skin, and may be based on the shape of the blade housing 110. For example, the shaving plane S may be defined as a plane that touches the top of the guard 112 and the top of the cap 113.

At least some among the blades 120 may have the cutting edges 121*d* positioned below the shaving plane S. FIG. 8 illustrates the cutting edges 121*d* of all the blades 120 are positioned below the shaving plane S, but the cutting edges 121*d* of some blades 120 may be positioned above the shaving plane S according to embodiments.

When the skin contact portion 131 is pressed and urged downwards during the shaving process, the skin contact portion 131 moves downwards relative to the blade housing 110 while being elastically supported by the suspension portions 132 and 133.

Figure 9:
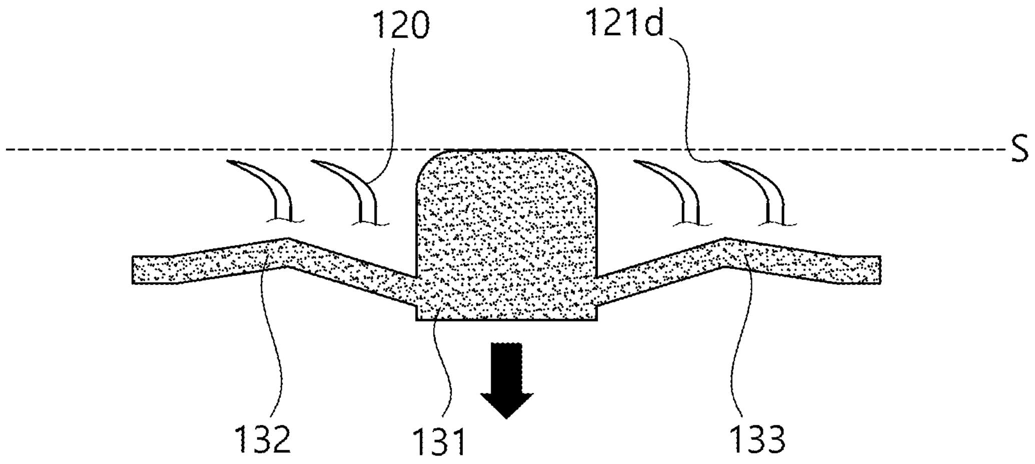
FIG. 9 schematically illustrates relative positions between a skin contact portion and blades while the skin contact portion is pressed.

FIG. 9 schematically illustrates relative positions between the skin contact portion 131 and the blades 120 while the skin contact portion 131 is pressed.

Referring to FIG. 9, the top of the skin contact portion 131 may move down to almost the same height as the shaving plane S during the shaving process.

However, the position of the skin contact portion 131 during the shaving process is not limited to that shown in FIG. 9. The top of the skin contact portion 131 may be positioned above or below the shaving plane S along the contour of a shaving area. In this case, referring to FIG. 10, two different shaving planes S1 and S2 may be formed with respect to the skin contact portion 131.

Figure 10:
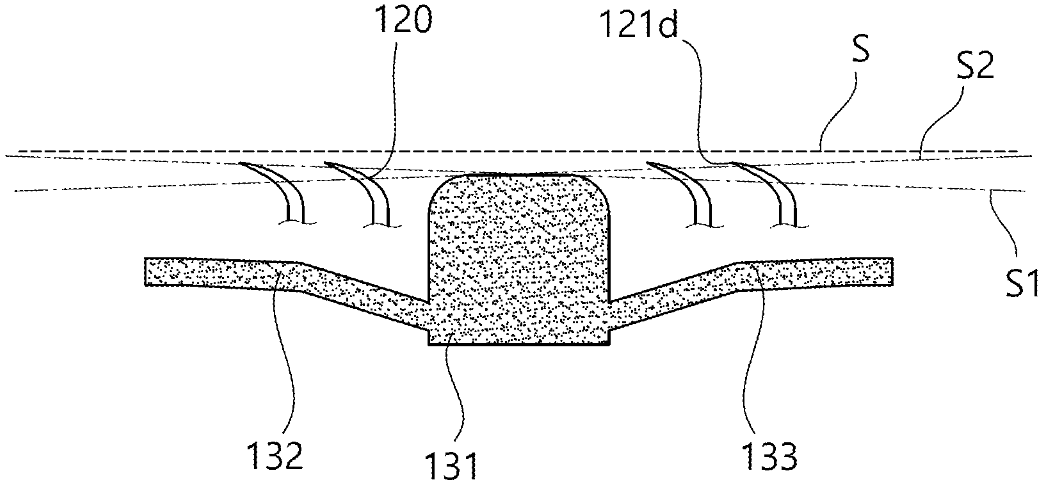
FIG. 10 illustrates that two shaving planes are formed by a skin contact portion while the skin contact portion is pressed.

FIG. 10 illustrates that two shaving planes are formed by the skin contact portion 131 while the skin contact portion 131 is pressed.

Referring to FIG. 10, the skin contact portion 131 is positioned below an initial shaving plane S, and the skin contact portion 131 forms a first shaving plane S1 that touches the top of the skin contact portion 131 and the top of the guard 112, and a second shaving plane S2 that touches the top of the skin contact portion 131 and the top of the cap 113.

As the shaving plane is changed from the initial shaving plane S into the first shaving plane S1 and the second shaving plane S2, distance relationships between the cutting edges of the blades 120 and the shaving planes S, S1 and S2 are also changed, thereby changing a sense of shaving that a user feels during the shaving process.

In other words, new shaving planes S1 and S2 are formed while the skin contact portion 131 moves up and down with respect to the initial shaving plane S along the curvature of a shaving area, thereby proving an improved three-dimensional sense of shaving to a user.

Below, the guard member according to an alternative embodiment will be described. For the convenience of description, parts similar to those of the first embodiment will be denoted by the same reference numerals, and repetitive descriptions thereof will be avoided.

Figure 11:
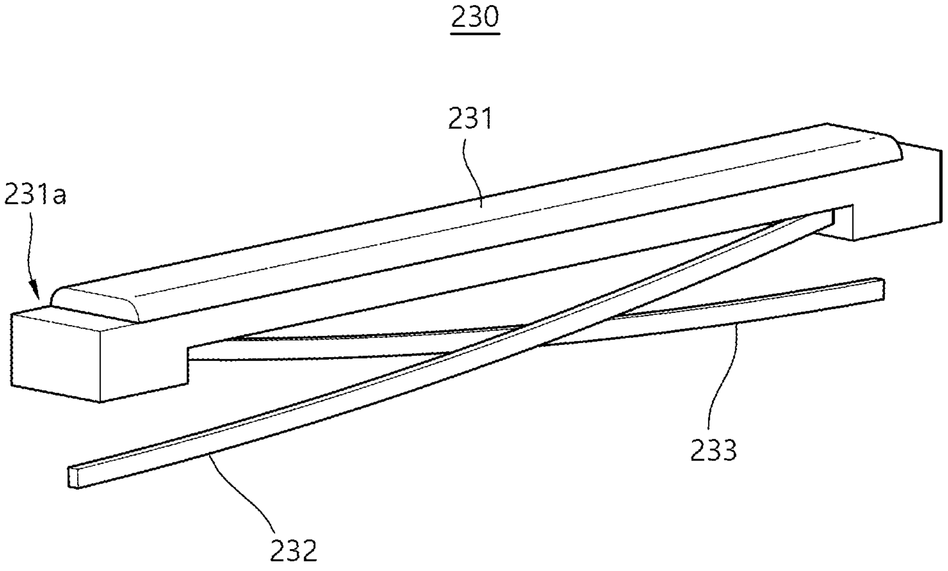
FIG. 11 is a perspective view showing a guard member according to a second embodiment.
Figure 12:
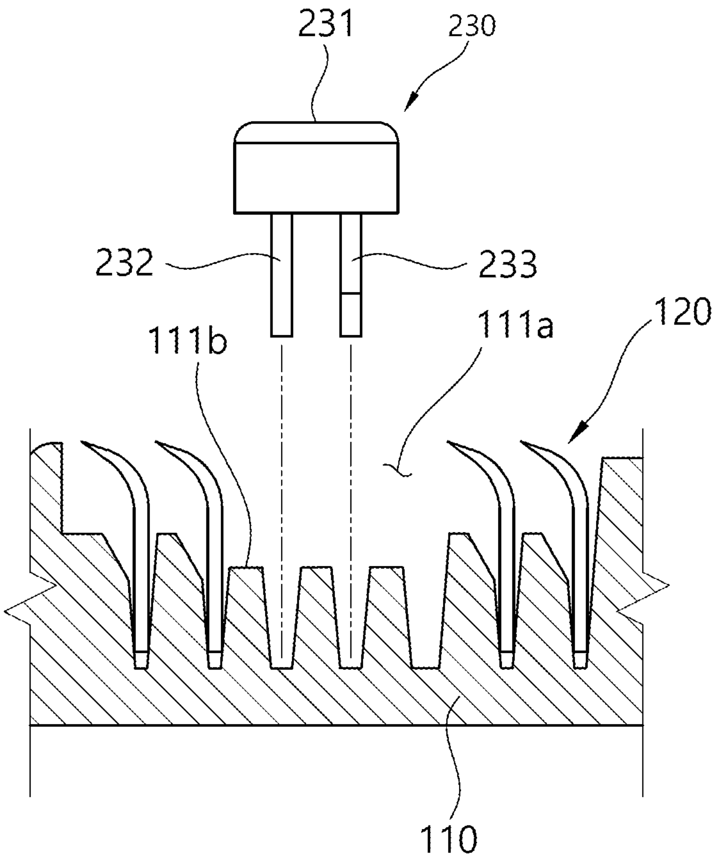
FIG. 12 is a view for illustrating an installation structure for the guard member according to the second embodiment.

FIG. 11 is a perspective view showing a guard member 230 according to a second embodiment, and FIG. 12 is a view for illustrating an installation structure for the guard member 230 according to the second embodiment.

Referring to FIG. 11, the guard member 230 according to the second embodiment also includes a skin contact portion 231 and suspension portions 232 and 233. The guard member 230 according to the second embodiment is longitudinally accommodated in the blade housing 110 so that the top of a skin contact portion 231 can be exposed to the top of the blade housing 110 through the blade window 111*a*.

Clip supporting grooves 231*a* may be formed at upper opposite ends of the skin contact portion 231. The clip supporting groove 231*a* performs a function similar to that of the clip supporting grooves 131*a* of the guard member 130 according to the first embodiment, and thus additional descriptions thereof will be omitted.

The guard pattern 134 may also be embossed or engraved on the top of the skin contact portion 231, and the lubricating material may be applied to the top of the skin contact portion 231. In addition, a plurality of combs 135 may be formed on the top of the skin contact portion 231, thereby combing hair during the shaving process.

Unlike the suspension portions 132 and 133 of the guard member 130 according to the first embodiment, the suspension portions 232 and 233 of the guard member 230 according to the second embodiment are longitudinally extended from the bottom of the skin contact portion 231.

In other words, the first suspension portion 232 is longitudinally extended from a first side on the bottom of the skin contact portion 231 toward a second side, and the second suspension portion 233 is longitudinally extended from the second side on the bottom of the skin contact portion 231 toward the first side. The first suspension portion 232 and the second suspension portion 233 may cross each other under the skin contact portion 231, but is not limited thereto. Alternatively, the first suspension portion 232 and the second suspension portion 233 may have various shapes as long as they can cause the skin contact portion 231 to have elasticity.

The ends of the first suspension portion 232 and the second suspension portion 233 are spaced apart from the skin contact portion 231, thereby giving elastic force and restoring force to the skin contact portion 231. Alternatively, the first suspension portion 232 and the second suspension portion 233 may be replaced by a structure of which a middle portion is spaced apart from the skin contact portion 231 and opposite ends are connected to the skin contact portion 231 as long as the structure causes the skin contact portion 231 to have the elastic force and the restoring force.

Referring to FIG. 12, the first suspension portion 232 and the second suspension portion 233 may be seated and supported by the seating portion 111*b* in the same manner that the blades 120 are seated and supported.

Because the guard member 230 according to the second embodiment is installed as the suspension portions 232 and 233 are seated in the seating portion 111*b*, it is easy to install the guard member 230 in a conventional blade housing including a plurality of blades. In other words, the guard member 230 may be installed in a place, from which one to three blades are removed, of the conventional blade housing, and therefore the conventional blade housing is usable without separately designing a new blade housing for the guard member 230.

The guard member 230 is not separated downwards from the blade housing 110 because the suspension portions 232 and 233 are supported by the seating portion 111*b*, and the guard member 230 is not separated upwards from the blade housing 110 because the clips 140 cover the opposite sides of the skin contact portion 131.

FIG. 11 illustrates an example that the skin contact portion 231 is elastically supported by two suspension portions 232 and 233, but the number of suspension portions may be varied according to embodiments.

Like the guard member 130 described above according to the first embodiment, the guard member 230 according to this embodiment includes the suspension portions 232 and 233 which provide the elastic force against force that acts on the skin contact portion 231 downwards and provide the restoring force that restores the skin contact portion 231 upwards. The effects of the suspension portions 232 and 233 have already been described above in the description of the guard member 130 according to the first embodiment, and therefore additional descriptions will be omitted.

Figure 13:
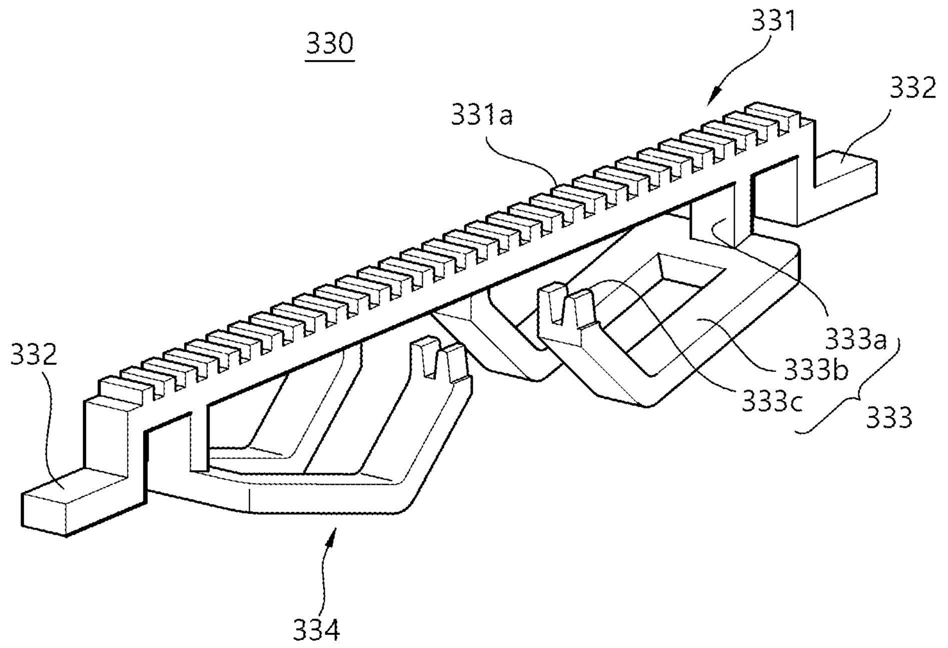
FIG. 13 is a perspective view showing a guard member according to a third embodiment.
Figure 14:
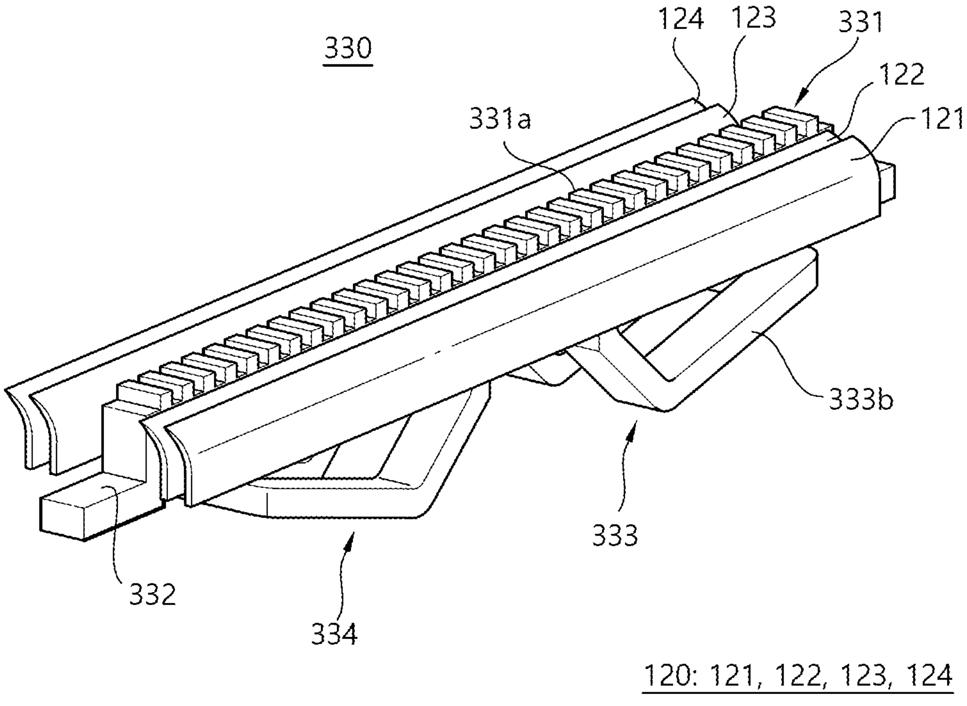
FIG. 14 is a perspective view showing that blades are installed in the guard member according to the third embodiment.
Figure 15:
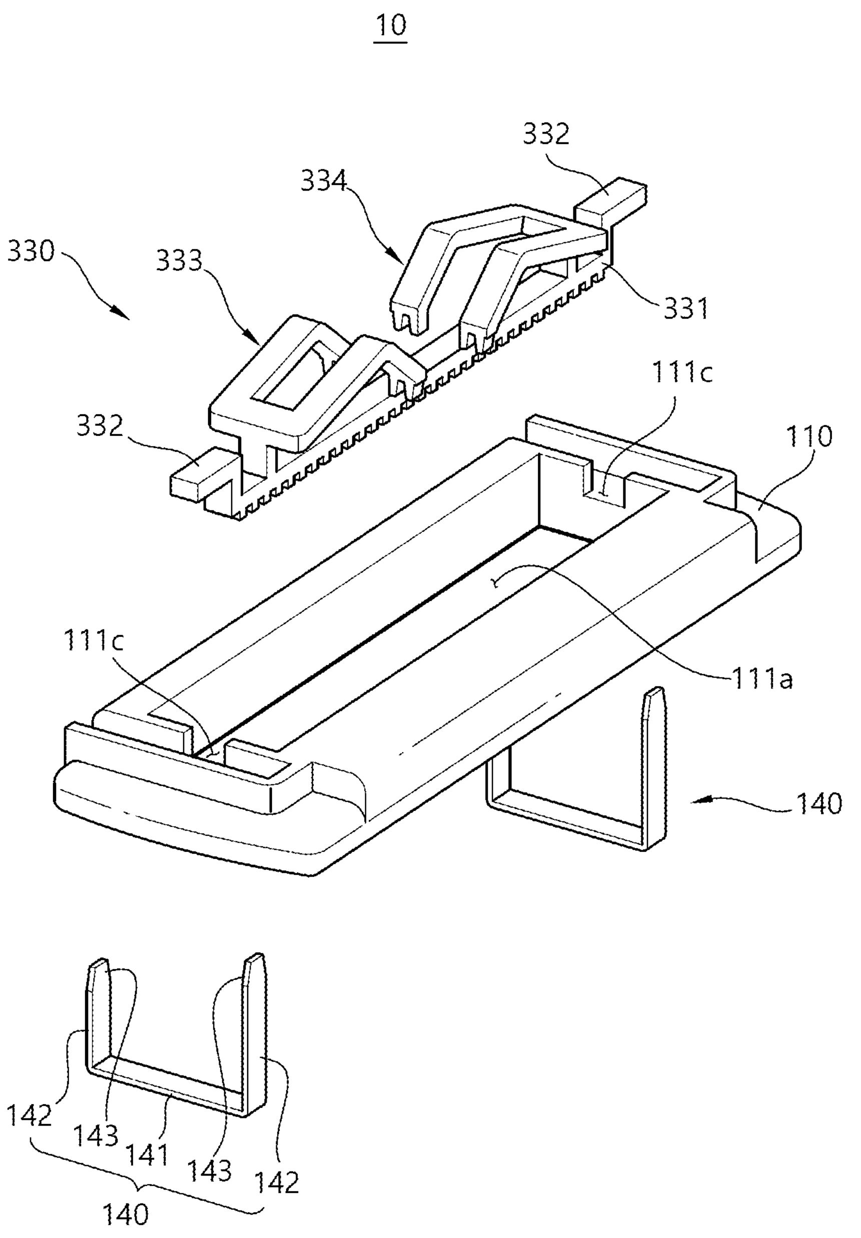
FIG. 15 is an exploded perspective view of a razor cartridge including the guard member according to the third embodiment.
Figure 16:
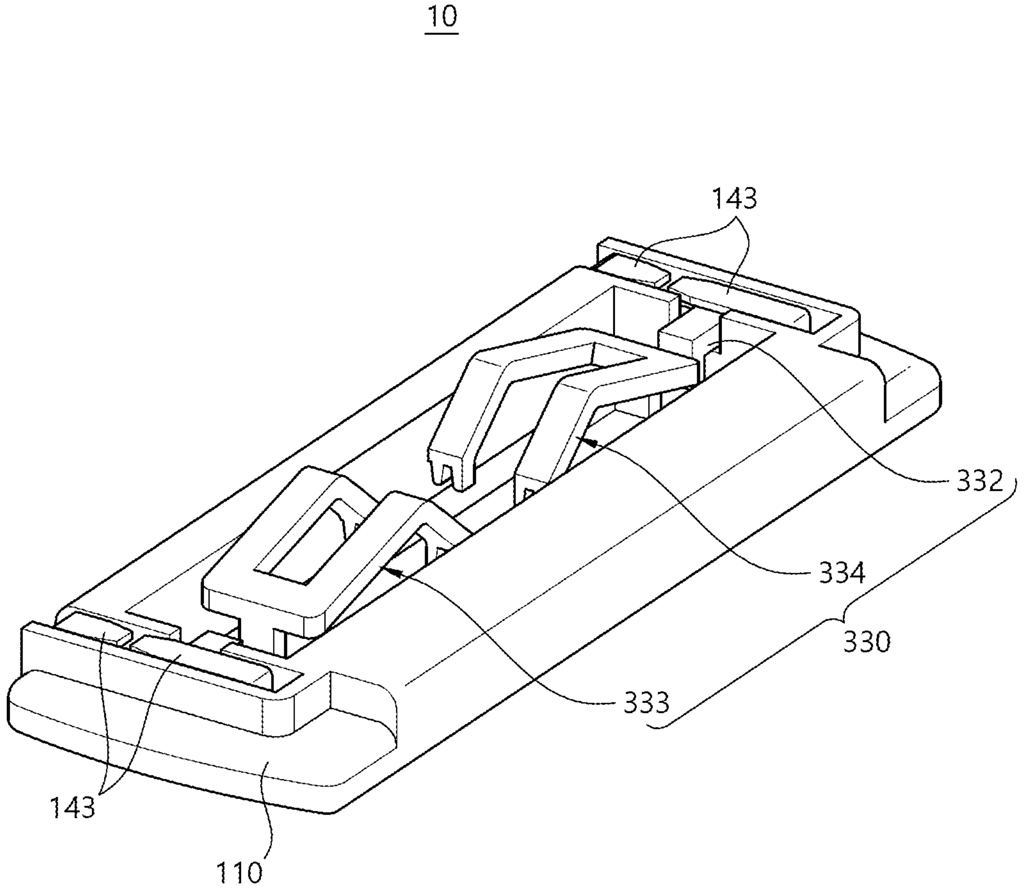
FIG. 16 is a perspective view showing the back of the razor cartridge including the guard member according to the third embodiment.

FIG. 13 is a perspective view showing a guard member 330 according to a third embodiment, FIG. 14 is a perspective view showing that blades 120 are installed in the guard member 330 according to the third embodiment, FIG. 15 is an exploded perspective view of a razor cartridge 10 including the guard member 330 according to the third embodiment, and FIG. 16 is a perspective view showing the back of the razor cartridge 10 including the guard member 330 according to the third embodiment.

Referring to FIG. 13, the guard member 330 according to the third embodiment includes a skin contact portion 331, coupling ends 332, and suspension portions 333 and 334.

The guard member 330 according to the third embodiment is similar to the guard members 130 and 230 according to the first and second embodiments in including the skin contact portion 331 and the suspension portions 333 and 334 extended from the skin contact portion 331. However, the guard member 330 according to the third embodiment is different from the guard members 130 and 230 according to the first and second embodiments in that the suspension portions 333 and 334 cause not the skin contact portion 331 but the blades 121, 122, 123, and 124 to move up and down.

The guard member 330 according to the third embodiment is longitudinally accommodated in the blade housing 110 so that the top of a skin contact portion 331 can be exposed to the top of the blade housing 110 through the blade window 111*a*.

As shown in FIG. 13, a plurality of combs 331*a* is formed on the top of the skin contact portion 331, extended in a transverse direction, and arranged side by side in a longitudinal direction, thereby combing hair during the shaving process.

In addition, a guard pattern (not shown) may also be embossed or engraved on the top of the skin contact portion 331, or a lubricating material may be applied to the top of the skin contact portion 331.

The coupling ends 332 may be extended from the opposite sides of the skin contact portion 331. Referring to FIGS. 15 and 16, the coupling ends 332 may be coupled to coupling-end accommodating grooves 111*c* formed on the bottom of the blade housing 110. As the coupling ends 332 are coupled to the coupling-end accommodating grooves 111*c*, the guard member 330 is not separated upwards from the blade housing 110. Further, like the guard members 130 and 230 according to the foregoing embodiments, the clips 140 may cover the opposite sides on the top of the skin contact portion 331, thereby preventing the guard member 330 from being separated upwards from the blade housing 110.

Referring FIG. 13, the suspension portions 333 and 334 may be longitudinally extended from the bottom of the skin contact portion 331, and include a first suspension portion 333 extended from a first side on the bottom of the skin contact portion 331 toward the center, and a second suspension portion 334 extended from a second side on the bottom of the skin contact portion 331 toward the center.

The first suspension portion 333 and the second suspension portion 334 have structures symmetrical to each other, and thus the first suspension portion 333 will be mainly described.

The first suspension portion 333 may include a support arm 333*a*, a swing arm 333*b*, and a seating portion 333*c*.

The support arm 333*a* is extended from the bottom of the skin contact portion 331 downwards and supports the swing arm 333*b*.

The swing arm 333*b* is approximately longitudinally extended from the support arm 333*a* toward the center. The swing arm 333*b* may be formed with the seating portion 333*c* at the free end thereof, and the swing arm 333*b* may be elastically supported by the support arm 333*a* and/or the skin contact portion 331. Referring to FIG. 13, the swing arm 333*b* may be branched from the support arm 333*a* toward the front and back of the skin contact portion 331 while forming a pair.

According to an embodiment, the support arm 333*a* may be omitted. In other words, the swing arm 333*b* may be extended from the skin contact portion 331.

The seating portion 333*c* may be formed on the top of the end portion of the swing arm 333*b*. The base portion 121*c* of the blade 120 is seated in the seating portion 333*c*.

Referring to FIGS. 13 and 14, each of the swing arms 333*b* forming a pair may be formed with the seating portion 333*c* in which two of the blades 121, 122, 123, and 124 are seated. In this way, two blades 123 and 124 are provided in front of the skin contact portion 331, and two blades 121 and 122 may be provided in back of the skin contact portion 331.

Meanwhile, unlike the first and second guard members 130 and 230 mounted at the front of the blade housing 110, the guard member 330 according to the third embodiment is mounted at the rear of the blade housing 110.

In the guard member 330 according to the third embodiment, the swing arms 333*b* supporting the blades 121, 122, 123, and 124 are elastically transformed with respect to the skin contact portion 331 and/or the blade housing 110, and the blades 121, 122, 123, and 124 are movable up and down relative to the blade housing 110 while maintaining close contact with skin.

In other words, during the shaving process, the swing arms 333*b* provide elastic force against force that acts on the blades 121, 122, 123, and 124 downwards, and provide restoring force that restores the blades 121, 122, 123, and 124 upwards. Therefore, during the shaving process, the blades 121, 122, 123, and 124 maintain the close-contact with skin while moving up and down relative to the blade housing 10 along the curvature of a face by the elastic force and restoring force of the swing arm 333*b*.

Because the blades 121, 122, 123, and 124 maintain the contact with skin while moving up and down along the curvature of the shaving area during the saving process, thereby improving a sense of close-contact with skin, achieving a less irritative shave, and providing a three-dimensional sense of shaving, during the shaving process.

Figure 17:
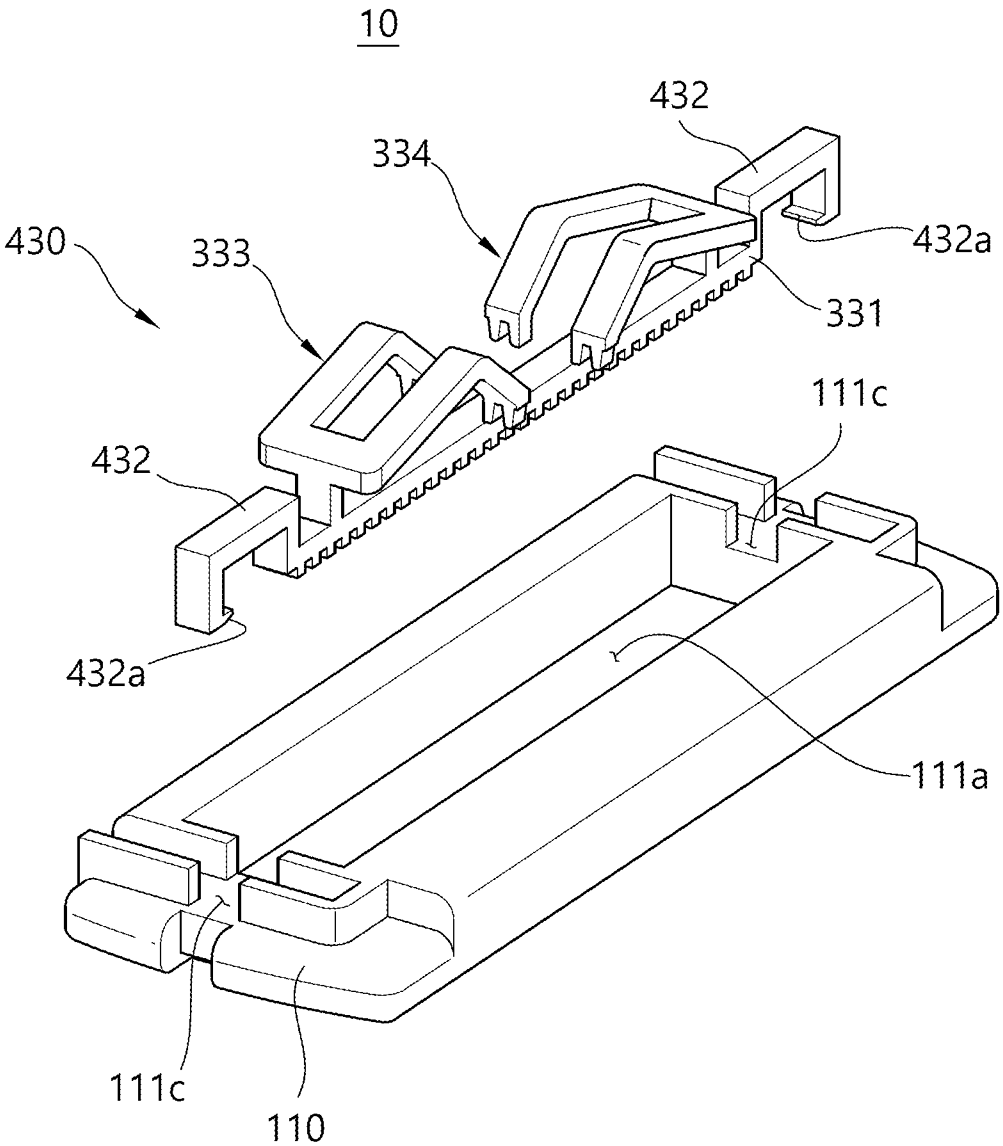
FIG. 17 is an exploded perspective view of a razor cartridge including a guard member according to a fourth embodiment.
Figure 18:
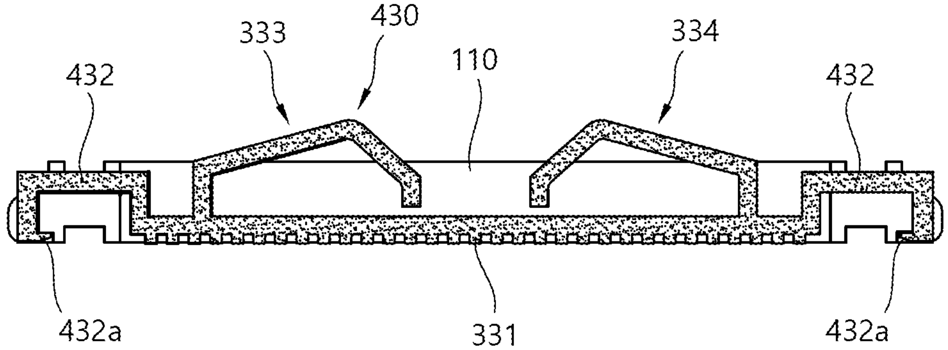
FIG. 18 is a schematic cross-sectional view showing a guard member according to a fourth embodiment installed in a blade housing.

FIG. 17 is an exploded perspective view of a razor cartridge 10 including a guard member 430 according to a fourth embodiment, and FIG. 18 is a schematic cross-sectional view showing a guard member according to a fourth embodiment installed in a blade housing.

Referring to FIGS. 17 and 18, the guard member 430 according to the fourth embodiment is different from the guard member 330 according to the third embodiment in the structure of a coupling end 432.

The guard member 330 according to the third embodiment has a structure to be prevented from being separated downwards from the blade housing 110 because the coupling ends 332 are supported by the second extensions 143 while being accommodated in the coupling-end accommodating grooves 111*c*.

On the other hand, the guard member 430 according to the fourth embodiment includes the coupling ends 432 formed to surround the outer lateral sides of the blade housing 110. Further, the coupling end 432 may include a hook end 432*a* at the end thereof to be hooked to the top of the blade housing 110.

Therefore, the guard member 430 according to the fourth embodiment can be more firmly coupled to the blade housing 110 than the guard member 330 according to the third embodiment. Further, the guard member 430 according to the fourth embodiment may not use the clip 140 so as to be prevented from being separated from the blade housing 110.

Like the guard member 330 described above according to the third embodiment, the guard member 430 according to this embodiment also includes the swing arms 333*b* to provide the elastic force and the restoring force to the blades 121, 122, 123, and 124, so that the blades 121, 122, 123, and 124 can maintain close contact with skin while moving up and down relative to the blade housing 110. The effects of the swing arms 333*b* have already been described above in the description of the guard member 330 according to the third embodiment, and therefore additional descriptions will be omitted.

A person having ordinary knowledge in the art to which the disclosure pertains can understood that the disclosure may be embodied in other specific forms without changing technical spirit or essential features. Accordingly, the embodiments described above are illustrative and not restrictive in all aspects. The scope of the disclosure is defined by the appended claims rather than the foregoing detailed description, and all changes or modifications derived from the meaning and scope of the appended claims and their equivalents are construed as falling within the scope of the disclosure.

What is claimed is:

1. A razor cartridge comprising: at least one blade formed with a cutting edge; a blade housing longitudinally accommodating the at least one blade, and comprising a top to which the cutting edge is at least partially exposed and a bottom opposite to the top; and a guard member comprising a skin contact portion at least partially exposed to the top, and longitudinally accommodated in the blade housing so that the skin contact portion can move up and down relative to the blade housing, wherein the guard member further comprises a suspension portion laterally extending from a side surface of the skin contact portion, wherein the suspension portion provides elastic force against force acting on the skin contact portion downwards, and restoring force to restore the skin contact portion upwards, wherein the at least one blade further comprises an edge portion formed with the cutting edge, and a base portion extended from the edge portion, wherein the skin contact portion and the suspension portion are integrally formed, wherein the blade housing includes a seating portion, and wherein a base portion of the at least one blade is inserted into a seating groove of the seating portion, and wherein the skin contact portion is movable in a vertical direction from the top to the bottom of the blade housing, independently of the blade, wherein the suspension portion comprises: a first suspension portion extending in a direction from a first side surface of the skin contact portion, and a second suspension portion extending in an opposing direction from a second side surface of the skin contact portion opposite the first side surface, wherein the blade housing comprises: a guard provided in a front thereof toward which the cutting edge faces, the guard being different from the guard member, and a cap provided in a back thereof opposite to a direction in which the cutting edge faces, and wherein the first suspension portion is inserted into the guard, and the second suspension portion is inserted into the cap.

2. The razor cartridge of claim 1, wherein the suspension portion provides the elastic force and the restoring force while being directly or indirectly supported by the blade housing.

3. The razor cartridge of claim 2, wherein the blade housing comprises a recessed portion to at least partially accommodate the suspension portion.

4. The razor cartridge of claim 1, further comprising a clip coupled to the blade housing so as to hold the at least one blade in the blade housing, wherein the clip comprises: a supporter positioned on the top to partially cover the cutting edge; a first extension extended from the supporter toward the bottom; and a second extension transversely extended from the first extension, and wherein the second extension supports a bottom of the skin contact portion so as to prevent the guard member from being separated through the bottom of the blade housing.

5. The razor cartridge of claim 1, wherein: the at least one blade further comprises an edge portion formed with the cutting edge, and a base portion extended from the edge portion, and the suspension portion is supported by the seating portion.

6. The razor cartridge of claim 5, further comprising a clip coupled to the blade housing so as to hold the at least one blade in the blade housing, wherein the clip comprises: a supporter positioned on the top to partially cover the cutting edge and the skin contact portion; a first extension extended from the supporter toward the bottom; and a second extension transversely extended from the first extension so as to prevent the at least one blade from being separated through the bottom of the blade housing.

7. The razor cartridge of claim 1, wherein the skin contact portion protrudes more upwards than the cutting edge in a free state where no external force acts on the guard member.

8. The razor cartridge of claim 1, wherein the skin contact portion protrudes upwards from a shaving plane of connecting the guard and the cap in a free state where no external force acts on the guard member.

9. The razor cartridge of claim 1, wherein the at least one blade comprises a plurality of blades, and wherein the skin contact portion and at least part of the suspension portion of the guard member are disposed in a space between two adjacent ones of the plurality of blades.

* * * * *